United States Patent [19]

Litzenberg

[11] 4,065,231
[45] Dec. 27, 1977

[54] MOTOR DRIVEN PUMP

[76] Inventor: David P. Litzenberg, 1523 Bryant Lane, Meadowbrook, Pa. 19046

[21] Appl. No.: 731,303

[22] Filed: Oct. 12, 1976

Related U.S. Application Data

[63] Continuation-in-part of Ser. No. 541,491, Jan. 27, 1975, abandoned.

[51] Int. Cl.$^2$ .................. F04B 17/00; F04B 35/04
[52] U.S. Cl. .................. 417/357; 417/365
[58] Field of Search .......... 417/357, 365, 370, 371; 415/104, 107

[56] References Cited

U.S. PATENT DOCUMENTS

| | | | |
|---|---|---|---|
| 2,741,990 | 4/1956 | White | 417/370 |
| 2,796,835 | 6/1957 | White | 417/357 |
| 2,913,988 | 11/1959 | White | 417/357 |
| 3,128,712 | 4/1964 | Sence | 417/357 |
| 3,138,105 | 6/1964 | White | 417/357 |
| 3,220,349 | 11/1965 | White | 417/365 |
| 3,288,073 | 11/1966 | Pezzillo | 417/357 |
| 3,395,644 | 8/1968 | Grebel et al. | 417/357 |

Primary Examiner—William L. Freeh
Assistant Examiner—L. J. Casaregola
Attorney, Agent, or Firm—Zachary T. Wobensmith, 2nd; Zachary T. Wobensmith, III

[57] ABSTRACT

A motor driven pump is described having an improved and simplified construction of pump casing and impeller with easy adaptability of the components over a wide range of capacity, an improved construction of the motor stator and rotor with structure which is adaptable for selection for use over a wide range of input, improved structure for alignment and support of the motor stator and of the motor rotor, adequate provisions for cooling and for pressure balancing and which may be made explosionproof, if desired.

5 Claims, 3 Drawing Figures

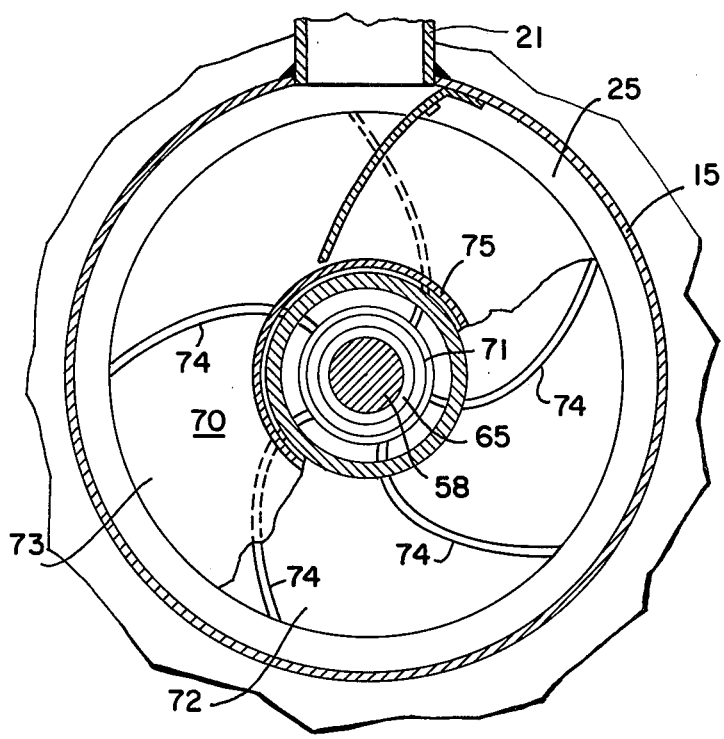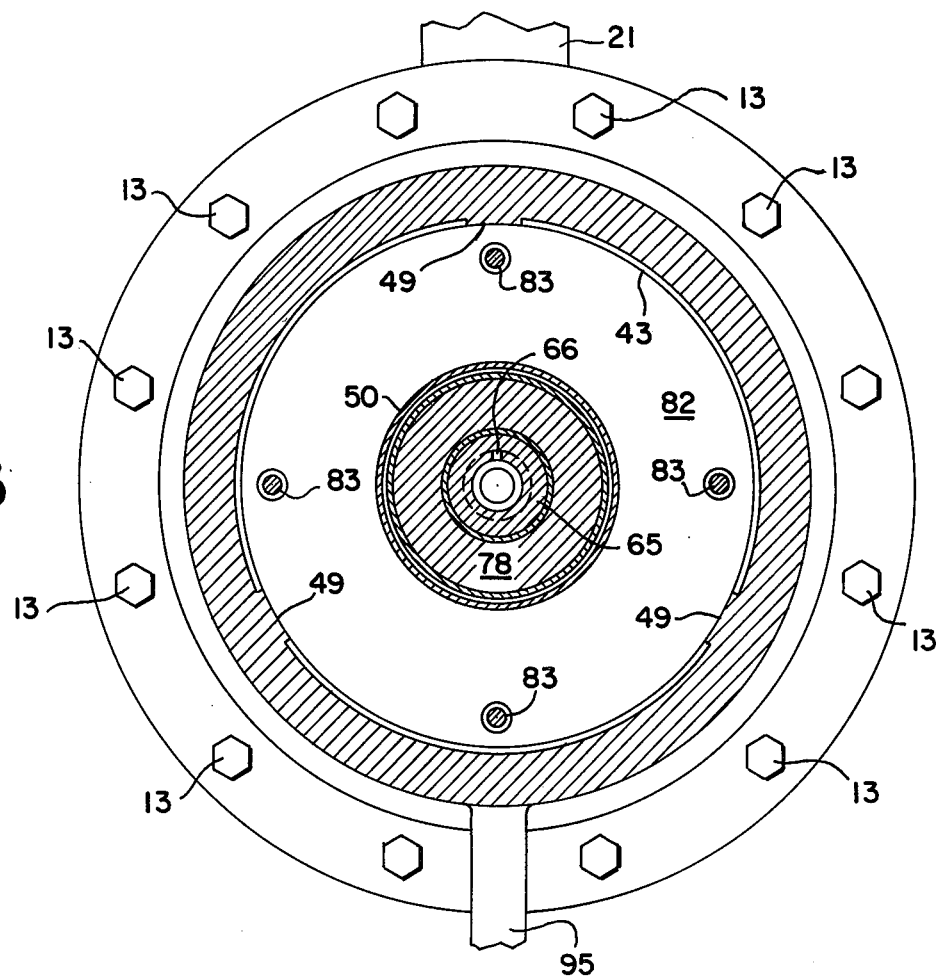

MOTOR DRIVEN PUMP

CROSS REFERENCE TO RELATED APPLICATIONS

This application is a continuation in part of my prior application for letters patent for MOTOR DRIVEN PUMP, filed Jan. 27, 1975, Ser. No. 541,491 abandoned.

BACKGROUND OF THE INVENTION

1. Field of the Invention

This invention relates to motor driven pumps.

2. Description of the Prior Art

Many designs of motor driven pumps have heretofore been proposed among which are those shown in U.S. patents to White, U.S. Pat. Nos. 2,713,311, 2,741,990, 2,763,214, 2,796,835, 2,906,208, 2,913,988, 3,053,189, 3,111,000, 3,138,105, 3,220,349, 3,220,350 and 3,280,750 and Litzenberg, U.S. Pat. No. 2,871,791.

It has been common practice in motor driven pumps in which the motor rotor and motor stator are isolated by a sleeve to support the outer end bearing of the motor rotor either by the use of a heavy casing or to rely upon the isolating sleeve in the stator to provide such support. Problems have arisen in the designs heretofore available of obtaining and maintaining alignment of the motor stator, and the motor rotor, and particularly of the end of the shaft remote from the impeller.

It has been difficult with the motor driven pumps heretofore available to achieve and maintain the desired tolerances and minimum clearances, including that at the air gap between the motor rotor and its isolating sleeve, and to provide part interchangeability with the desired tolerances and clearances.

It has also heretofore been propsed to provide simple suction inlet centrifugal motor driven pumps utilizing two orifices, one fixed and one variable, for providing a pressure effective on the rotor assembly to balance the pressure developed on the impeller. None of the structures heretofore proposed have proven wholly satisfactory in practice for various reasons.

White, in U.S. Pat. No. 3,138,105 shows a motor driven pump which has a hollow rotating shaft and a plurality of fixed orifices including grooves 55a of the bearing block 54, the clearances between the shaft 60 and the face of bearing 58 at the left of FIG. 1, the grooves 57a, the clearance between the motor rotor enclosure 67 and the sleeve 30, the clearance between the shaft 60 and the face of the bearing 58 at the right of FIG. 1. The multiplicity of fixed orifices in series, the separate streams with variation of pressure drops with change of developed pressure results in an ineffectual structure which has no standard pressure drop or flow limitation for utilization at the variable orifice between the end face 64 and the inner surface of the sleeve end closure plate 32. The structure disclosed in this White patent also lacks the advantages in manufacture of the pump of the present invention.

White, in U.S. Pat. No. 3,220,349, shows a motor driven pump which has a hollow rotating shaft and a wearing ring on the impeller to create a pressure drop and a variable orifice intended to provide the balancing pressure. A wearing ring is non-compensating due to the variation of its pressure drop with wear, change of length and change of diameter.

This patent, in addition to the wearing ring has three other fixed orifices at the ports 36, the gap between the enclosure 40 of the motor rotor and the sleeve 25, and the grooves in the bearing 33 at both sides of motor rotor. The variable orifice 55 is called upon to function with three fixed orifices which are widely diverse in design and pressure drops. The variable orifice 55 at shut off point when it contacts the back face of the impeller will have wear contact due to axial thrust and will not function properly after normal wear occurs.

The multiplicity of fixed orifices, planned or unplanned, results in a lack of a standard or measurable fixed orifice for operation with a variable orifice, with resultant incapability of automatic accommodation to all the variables of impeller diameters, speeds, and specific gravities or viscosities of the fluid being pumped.

White, in U.S. Pat. No. 3,280,750, shows a motor driven pump with orifices providing flame traps for explosion proof uses. A rotating shaft is employed. A wearing ring is provided for controlling pressures on portions of the impeller but is restricted to a single size of impeller diameter. Four fixed orifices are shown, one at 36 which is a flame trap which can clog, the gap 40 between the impeller enclosure and the isolating sleeve, the bearing passageway 40 and the flame path 49. The limit on clearances is stated as not to exceed 0.0036 inch. The restriction on the flame path 49 used as a variable orifice so severely restricts the flow as to make it unreliable for achieving axial thrust balance.

This structure, with its multiplicity of orifices and limitations on its effectiveness is subject to the same shortcomings as those of the White patents previously referred to.

Pezzillo, in U.S. Pat. No. 3,288,073, shows a canned pump intended to have reduced hydraulic thrust. Pezzillo has a hollow rotating shaft with axial thrust washer and bearings described as in contact at all times so that no "floating" shaft would be available.

Pezzillo, like the White patents previously referred to, does not have any available standard fixed orifice for operation with a variable orifice with resultant incapability of automatic accommodation to variables which are inescapable in pump design and operation.

A simplified motor driven pump is provided which overcomes many of the shortcomings of the motor driven pumps heretofore available, particularly as to pressure balancing of the impeller and motor rotor.

SUMMARY OF THE INVENTION

In accordance with the invention a motor driven pump is provided with an improved construction including pump housing and pump impeller, motor housing and motor rotor, employing a non-rotating fixed hollow mandrel for free fluid return to the suction inlet, the impeller rotor assembly with its encased rotating bearings being axially free floating on the mandrel to a completely neutral axial balancing position under all conditions of impeller diameters, viscosity and specific gravity of the fluids being pumped, speed of rotation and developed fluid pressures, this being accomplished by the use of one fixed orifice to establish a standard and positive pressure differential from the high pressure side of the impeller to the inlet, the floating movement of the rotor-impeller assembly balancing the thrust by covering or uncovering a port on the hollow mandrel, the port being sized so that under all conditions of required pressure balance it has the capacity to pass more fluid from the balancing chamber than can be delivered through the fixed orifice thereby to control the balancing pressure in the balancing chamber.

It is the principal object of the invention to provide an improved motor driven pump having effective pressure balancing of the rotor and impeller assembly.

It is a further object of the invention to provide a motor driven pump in which the pressure balancing of the rotor and impeller assembly is accomplished in a simple but effective manner.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which

FIG. 2 is a transverse vertical sectional view taken approximately on the line 2—2 of FIG. 1 and with part of the impeller further broken away; and FIG. 3 is a transverse vertical sectional view taken approximately on the line 3—3 of FIG. 1.

Figure 1:
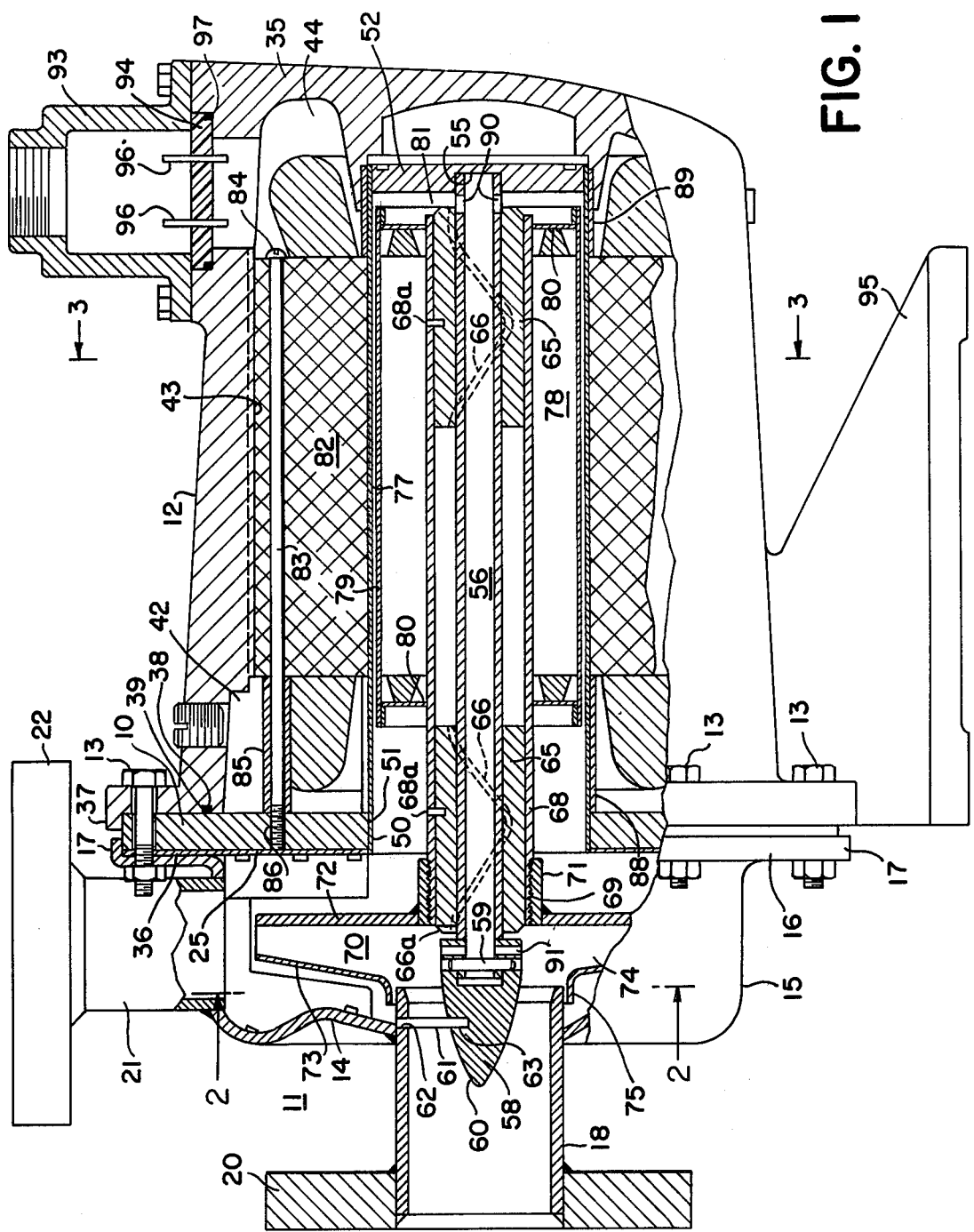
FIG. 1 is a vertical longitudinal central sectional view of a motor driven pump in accordance with the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, a post member preferably in the form of a disc 10 is provided to which a pump housing 11 and motor stator housing 12 are secured by bolts 13. The post member 10 is rigid and, as will hereinafter more fully appear, serves as a starting point or reference element and to which all the desired tolerances can be related.

The pump housing 11 can be of any desired type, may be in the form of a volute but is preferably circular in transverse cross section as described in more detail in my application for U.S. Letters Patent for CENTRIFUGAL PUMP, filed Jan. 27, 1975, Ser. No. 541,492, now U.S. Pat. No. 3,967,915, issued July 6, 1976, with a dished end wall portion 14, a side wall portion 15 and an attaching flange 16 through which the bolts 13 extend. The flange 16 has a peripheral rim 17 in overlapping relation to the post 10 for positioning of the pump housng 11. The pump housng 11, because of its shape, can be made as a stamping from sheet metal. A longitudinally axially disposed fluid inlet connection 18 is provided secured to the end wall portion 14 with a flange 20 secured thereto, as by welding, for connection to a fluid supply line (not shown).

A radially disposed fluid delivery connection 21 is provided secured to the side wall portion 15 and can have a flange 22 secured thereto by welding for connection to a fluid delivery line (not shown).

A front end shroud 25 is preferably interposed between the flange 13 and the disc 10, in covering and protective relation to the outer face of the post disc 10.

The motor housing 12, which may be made as a generally cylindrical casting with a closed end wall 35, preferably has an end face 36 for engagement with the post disc 10 and an overlapping peripheral rim 37 for positioning and for clamping engagement with the post disc 10. The end face 36 is provided with an end groove 38 for reception of a packing 39, such as an O-ring, to prevent fluid leakage at this location.

The motor housing 12 has a converging interior space 42 from which a cylindrical space 43 extends toward the end wall 35. From the space 43 a space 44 extends to the end wall 35 and a central inwardly extending hollow circular rim 45 is provided. The rim 45 is provided with an inner end shoulder 46, a cylindrical surface 47 and a larger cylindrical surface 48.

The space 43 is provided with a plurality of pads 49, preferably spaced at 120°.

The post disc 10 has secured thereto an isolating sleeve 50 of non-magnetic responsive material, preferably stainless steel. The shroud 25 preferably is connected to the sleeve 50 which extends through a central opening 51 in the disc 10. The opposite end of the sleeve 50 extends along the surface 47 and is closed by an end closure and rear shaft support plate 52 preferably of stainless steel and welded to the sleeve 50.

The plate 52 has a central socket 55 for receiving the rear end of a fixedly mounted hollow mandrel 56.

The mandrel 56, at the front end thereof, is carried in a fluid guiding inlet plug 58 an retained therein by a diameterically disposed pin 59. The inlet plug 58 has an external fluid guiding surface 60 and is preferably supported by a plurality of radial pins 61, three at 120° spacing being preferred, extending through openings 62 in the pipe 18 and into openings 63 in the plug 58.

The fixed mandrel 56 has spaced bearings 65 thereon, which may be of carbon or the like, preferably each with a helical opening 66 along the mandrel 56 for liquid flow for cooling and lubrication. The opening 66 has a slot 66a in the end face for access of liquid to the opening 66.

A hollow tubular shaft 68 to which the bearings 65 are preferably attached by shrinking or by a pin 68a has an impeller 70 of any desired type secured thereto, such as by a collar 71 in threaded engagement with the shaft 68 at 69 and with the impeller 70 is partial overlapped relation to and supported by one of the bearings 65 for stability. The collar 71 is shown as having a shroud plate 72 welded thereto with a spaced shroud plate 73 and interposed vanes 74 secured between the plates 72 and 73. The shroud 73 preferably has a front rim 75 welded thereto and extending over the inner end of the pipe 17. The impeller 70 can be changed in accordance with the desired capacity and/or head characteristics of the impeller 70 or of the viscosity of the fluid to be handled and with a cut water or pump casing tongue 30 corresponding thereto.

The shaft 68 also has secured thereto a motor rotor 78 which is shown as of the "canned" type, enclosed by a cylindrical cover 79 and end plates 80 to shield the motor rotor 78 against contact by the liquid being pumped. The length of the motor rotor 78 can be varied to accord with the desired horse power input.

The housing 12, in the space 43, has a motor winding assembly 82 supported on the pads 49 and held in position and against longitudinal axial movement by tie rods 83 having heads 84 and spacers 85. The tie rods 83 have threaded ends 86 engaged in the post disc 10.

The motor winding assembly 82 is preferably of a length in accordance with the length of the motor rotor 78, thus accommodating, for one size mandrel 56, shaft 58 and sleeve 50, a plurality of sizes of motor components, with attendant cost savings.

The sleeve 50, on the exterior thereof between the end of the winding 82 and the post disc 10, has a protective collar 88, and on the exterior thereof between the winding 82 and the circular rim 45 and for engagement by the surface 48 has a protective collar 89. The protective collars 88 and 89 prevent the internal pressure effective on the isolating sleeve 50 from causing distortion or rupture of the sleeve 50 and the collar 89 provides a support for the rear end of the sleeve 50 and is dimensionally related back to the post 10.

The length of the collar 89 will be determined by and varied in accordance with the length of the winding 82.

A portion of the fluid in the pump housing 11 can pass freely into the interior of the isolating sleeve 50 and to and along the opening 77 provided by the clearance between the motor rotor cover 79 and the sleeve 50 to the space 81 at the right of the motor rotor 78 in FIG. 1, and enter the fluid openings 66 in the bearing 65 at the right and then advance to the left in the space between the bearings 55 and then through the fluid opening 66 in the bearing 65 at the left and return to the pump housing 11 for cooling and for bearing lubrication.

A portion of the fluid in the chamber 81 at the right end of the motor rotor 78 (see FIG. 1) can also enter through orifices 90 in the fixed mandrel 56, move to the left along the interior of the mandrel 56 and return to the pump housing 11 through openings 91 in the mandrel 56 and inlet plug 58. The space 81 within the sleeve 50, at the right of the motor rotor 78 is available to serve as a balancing chamber.

The clearance space 77 between the motor rotor cover 79 and the sleeve 50 serves as a fixed control orifice affecting the pressure within the chamber 81. The ports 90, as partially covered or uncovered by the bearing 65 by longitudinal axial movement of the shaft 68 along the fixed mandrel 56 provide a variable orifice to determine the pressure applied in the chamber 81 on the right end of the motor rotor 78 for balancing.

The housing 12 has a connector housing 93 in holding relation to an insulating and fluid tight connector plate 94. The plate 94 engages and holds a packing ring 97 in fluid tight relation. The plate 94 has conductor pins 96 therethrough for the internal and external connection of electrical leads (not shown) for input to the stator windings 82 which are isolated from the fluid being pumped by the isolating sleeve 50.

The housing 12 can be supported in any desired manner, a base 95 being shown which forms part of the motor housing 12.

The mode of operation will be obvious from the foregoing but may be summarized briefly.

Energization of the fixed windings 82 is effective for rotation of the motor rotor 78 to drive the shaft 68 and the impeller 70 mounted thereon. Fluid entering through the pipe 18 and guided by the inlet plug is delivered by the impeller 70 for delivery through the delivery pipe 21.

The pressures developed by the impeller 70 in the pump housing 11 establish a high forward thrust imbalance since the area on the intake side of the impeller 70 is less than that on the opposite side. Changes in speed, impeller diameters, and the specific gravity of the liquid being pumped, while relative and constantly forward do result in a variation in the pressures required to obtain a balance condition of thrust.

With the present invention two orifices are utilized, a fixed and constant orifice along the opening 77 and a variable orifice at the ports 90.

The area at the inlet 18 to the impeller 70 (FIG. 1) is less than the area to the right of the impeller 70 which results in a forward thrust (i.e. to the left) being imparted to the impeller 70. The fluid pressure developed by the impeller 70 is directly effective at the fixed orifice 77 for delivery of pressure to the balancing chamber 81 where the pressure acts upon the motor rotor as a forward thrust force. The orifice at the ports 90 is in communication through the interior passageway in the fixed mandrel 56, and through the openings 91 to the inlet of the impeller 70. The areas of the interior of the mandrel 56, the ports 90 and the openings 91 are sufficient to transfer all the fluid in the balancing chamber 81 to the inlet of the impeller 70 when the ports 90 are fully open as a result of thrust action moving the impeller and rotor assembly, and the rear bearing 65, forward. Lowered pressure in the balancing chamber 81 by reason of the pressure differential effective on the impeller and rotor assembly causes at least partial covering of ports 90 by the rear bearing 65, so that the pressure effective on the assembly moves it toward the right until a balanced condition of forces acting axially on the assembly is achieved.

The ports 90 will be covered or uncovered by rear bearing 65, dependent on pressure changes, to maintain a balanced condition. The fixed orifice 77 establishes with the variable orifice at the ports 90 a standard and positive pressure differential with accommodation to variations in speed, impeller diameter and specific gravity of the fluid.

If different impellers 70 and motor rotors 78 are substituted the relationship of force application for balancing will still remain effective.

It will be seen that structure has been provided with which the objects of the invention are attained.

I claim:

1. A motor driven pump comprising
   a rigid post member,
   an impeller housing carried by said post member on one side thereof and having a fluid inlet connection and a fluid delivery connection communicating with the interior thereof,
   a motor housing carried by said post member on the other side thereof, and having a motor stator therein,
   said post member having a motor stator isolating sleeve extending therefrom and into said motor housing interiorly of said motor stator,
   said sleeve having an end closure remote from said post member,
   a hollow mandrel carried at one end in said impeller housing and at the other end in said end closure,
   a rotary impeller shaft journalled on said mandrel and movable axially thereon,
   an impeller in said impeller housing secured to said shaft and a motor rotor in said motor housing and in spaced relation to said sleeve,
   said motor rotor being in spaced relation to said sleeve to provide a fixed orifice with an inlet in communication with said impeller housing at the outlet of the impeller and with an outlet in communication with a pressure chamber between said motor rotor and said end closure,
   said mandrel being in communication at one end with the inlet of said impeller and at the other end having port means communicating with said pressure chamber, said motor rotor being longitudinally axially movable for varying the size of said port means and the discharge of fluid and control of pressure in said pressure chamber.

2. A motor driven pump as defined in claim 1 in which the areas of said port means and of the interior of the mandrel are sufficient to completely discharge the pressure in said pressure chamber.

3. A motor driven pump as defined in claim 1 in which said impeller shaft has a portion rotatable therewith and movable axially therewith to vary the size of said port means.

4. A motor driven pump as defined in claim 3 in which said portion rotatable with said impeller shaft is a bearing.

5. A motor driven pump as defined in claim 1 in which said impeller shaft is supported on said mandrel for rotary and axial movement by spaced bearings fixed to the interior of said impeller shaft, one of said bearings being movable with said shaft for varying the size of said port means.

* * * * *